US012812457B2

(12) United States Patent
Kang et al.

(10) Patent No.: US 12,812,457 B2
(45) Date of Patent: Nov. 24, 2026

(54) METHOD AND APPARATUS FOR HANDLING ENHANCED ASSISTANCE INFORMATION FOR SCHEDULING IN WIRELESS COMMUNICATION SYSTEM

(71) Applicant: SAMSUNG ELECTRONICS CO., LTD., Suwon-si (KR)

(72) Inventors: Hyunjeong Kang, Suwon-si (KR); Anil Agiwal, Suwon-si (KR); Taeseop Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 18/347,462

(22) Filed: Jul. 5, 2023

(65) Prior Publication Data

US 2024/0015577 A1 Jan. 11, 2024

(30) Foreign Application Priority Data

Jul. 5, 2022 (KR) ........................ 10-2022-0082482
Jul. 5, 2022 (KR) ........................ 10-2022-0082483

(51) Int. Cl.
*H04W 28/02* (2009.01)
*H04L 47/56* (2022.01)

(52) U.S. Cl.
CPC ......... *H04W 28/0278* (2013.01); *H04L 47/56* (2013.01); *H04W 28/0231* (2013.01)

(58) Field of Classification Search
CPC ..... H04W 80/02; H04W 72/23; H04W 72/21; H04W 24/08; H04W 28/0278;
(Continued)

(56) References Cited

U.S. PATENT DOCUMENTS

2007/0183350 A1* 8/2007 Walker .................. H04L 65/765 370/310
2010/0284356 A1* 11/2010 Ray ..................... H04W 28/065 370/328

(Continued)

FOREIGN PATENT DOCUMENTS

EP 3425954 A1 1/2019
EP 3737173 A1 11/2020

(Continued)

OTHER PUBLICATIONS

International Search Report and Written Opinion of the International Searching Authority dated Oct. 18, 2023, in connection with International Application No. PCT/KR2023/009413, 3 pages.

(Continued)

*Primary Examiner* — Djenane M Bayard

(57) ABSTRACT

The disclosure relates to a 5G or 6G communication system for supporting a higher data transmission rate. Specifically, the present disclosure provides an apparatus and method of the terminal and base station to handle enhanced assistance information for a scheduler. The method comprises: receiving, from a base station, first information indicating that the base station supports a report of a remaining delivery time of an uplink data; identifying that a shortest remaining delivery time for at least one uplink data in a buffer is less than a threshold for a logical channel; and transmitting, to the base station, second information including an identity of the logical channel and information on the shortest remaining delivery time.

16 Claims, 9 Drawing Sheets

(58) Field of Classification Search

CPC ..... H04W 24/10; H04W 76/15; H04W 16/32; H04W 72/569; H04W 28/06; H04W 72/1268; H04W 76/27; H04W 36/023; H04W 72/0446; H04W 36/02; H04W 36/0235; H04W 72/1273; H04W 88/02; H04W 52/48; H04W 72/04; H04W 72/12; H04W 72/542; H04W 8/02; H04W 28/14; H04W 68/005; H04W 12/041; H04W 28/04; H04W 28/10; H04W 36/08; H04W 48/08; H04W 48/16; H04W 52/346; H04W 52/367; H04W 72/0466; H04W 72/0473; H04W 74/0808; H04W 76/11; H04W 76/28; H04W 80/08; H04W 88/08; H04W 88/16; H04W 12/106; H04W 24/02; H04W 28/02; H04W 28/0231; H04W 36/322; H04W 36/38; H04W 40/22; H04W 76/12; H04W 8/005; H04W 84/042; H04W 12/04; H04W 12/10; H04W 28/0236; H04W 36/0011; H04W 36/0033; H04W 36/22; H04W 48/20; H04W 52/0216; H04W 56/0045; H04W 8/18; H04W 8/26; H04W 84/06; H04W 84/18; H04W 24/00; H04W 28/0205; H04W 36/04; H04W 72/02; H04W 74/006; H04W 76/19; H04W 8/04; H04W 8/24; H04W 84/045; H04W 88/06; H04W 28/0268; H04W 28/0289; H04W 28/065; H04W 28/12; H04W 4/70; H04W 40/12; H04W 52/0212; H04W 52/0225; H04W 72/56; H04W 76/20; H04W 88/12; H04W 12/03; H04W 12/69; H04W 28/0273; H04W 28/16; H04W 28/22; H04W 28/26; H04W 4/06; H04W 4/08; H04W 4/24; H04W 40/02; H04W 40/20; H04W 52/383; H04W 56/00; H04W 56/001; H04W 68/04; H04W 72/1215; H04W 72/566; H04W 74/08; H04W 74/0833; H04W 76/23; H04W 76/40; H04W 8/186; H04W 88/04; H04W 92/18; H04W 28/0284; H04W 28/24; H04W 36/0005; H04W 36/0016; H04W 36/0044; H04W 36/00692; H04W 36/085; H04W 4/18; H04W 40/005; H04W 48/18; H04W 52/0229; H04W 52/0245; H04W 52/0248; H04W 52/0258; H04W 52/0261; H04W 52/0277; H04W 52/06; H04W 52/24; H04W 52/365; H04W 56/0065; H04W 60/00; H04W 60/06; H04W 68/02; H04W 72/0453; H04W 72/232; H04W 72/512; H04W 72/543; H04W 74/004; H04W 74/0816; H04W 76/18; H04W 76/34; H04W 8/22; H04W 72/231; H04W 40/023; H04W 40/28; H04W 72/1221; H04W 72/121; H04W 72/1263; H04W 72/20; H04W 72/53; H04L 47/263; H04L 47/29; H04L 47/58; H04L 47/728; H04L 47/28; H04L 65/00; H04L 5/0053; H04L 1/1685; H04L 1/188; H04L 41/0893; H04L 41/16; H04L 41/5067; H04L 43/065; H04L 43/0852; H04L 43/16; H04L 43/20; H04L 47/24; H04L 47/2416; H04L 47/30; H04L 5/0007; H04L 67/131; H04L 1/08; H04L 1/1614; H04L 1/1877

See application file for complete search history.

(56) References Cited

U.S. PATENT DOCUMENTS

| | | | | |
|---|---|---|---|---|
| 2013/0114566 | A1 | 5/2013 | Awoniyi et al. | |
| 2014/0036793 | A1 | 2/2014 | Johnsson et al. | |
| 2016/0165459 | A1* | 6/2016 | Takayanagi ........... | H04W 16/32 455/446 |
| 2018/0042042 | A1 | 2/2018 | Li et al. | |
| 2019/0199496 | A1* | 6/2019 | Qin ....................... | H04W 72/23 |
| 2020/0163109 | A1 | 5/2020 | Zhang | |
| 2020/0374888 | A1 | 11/2020 | Fan et al. | |
| 2020/0413285 | A1 | 12/2020 | Li et al. | |
| 2021/0014887 | A1 | 1/2021 | Lou et al. | |
| 2021/0105762 | A1* | 4/2021 | Pezeshki ............... | H04W 72/12 |
| 2021/0360469 | A1* | 11/2021 | Shrestha ............... | H04W 72/23 |

FOREIGN PATENT DOCUMENTS

| | | | | | |
|---|---|---|---|---|---|
| WO | WO-2021126789 | A1 * | 6/2021 | ............ | H04W 24/10 |
| WO | WO-2022019435 | A1 * | 1/2022 | ............ | H04W 28/02 |

OTHER PUBLICATIONS

III, “Views on XR specific RAN enhancement in QoS,” 3GPP TSG-RAN WG1 Meeting #109 electronic e-Meeting, May 2022, R1-2204820, 2 pages.

Supplementary European Search Report dated Sep. 3, 2025, in connection with European Patent Application No. 238358006, 10 pages.

Office Action dated Aug. 31, 2026, in connection with Indian Application No. 202517006100, 6 pages.

* cited by examiner

METHOD AND APPARATUS FOR HANDLING ENHANCED ASSISTANCE INFORMATION FOR SCHEDULING IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0082482 filed Jul. 5, 2022, and Korean Patent Application No. 10-2022-0082483 filed Jul. 5, 2022, in the Korean Intellectual Property Office, the disclosure of which are incorporated by reference herein in their entirety.

BACKGROUND

1. Field

The disclosure relates to a wireless communication system (or a mobile communication system). Specifically, the disclosure relates to an apparatus, a method and a system for handling enhanced assistance information for scheduling in wireless communication system. Also, the disclosure relates to an apparatus, a method and a system for enhanced scheduling request in wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 GHz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance assistance information handling for next generation node B (gNB) scheduler. Also, there are needs to enhance scheduling request in wireless communication system.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: receiving, from a base station, first information indicating that the base station supports a report of a remaining delivery time of an uplink data; identifying that a shortest remaining delivery time for at least one uplink data in a buffer is less than a threshold for a logical channel; and transmitting, to the base station, second information including an identity of the logical channel and information on the shortest remaining delivery time.

In accordance with another aspect of the disclosure, a terminal is provided. The terminal comprises: a transceiver; and a controller coupled with the transceiver and configured to: receive, from a base station, first information indicating that the base station supports a report of a remaining delivery time of an uplink data, identify that a shortest remaining delivery time for at least one uplink data in a buffer is less than a threshold for a logical channel, and transmit, to the base station, second information including an identity of the logical channel and information on the shortest remaining delivery time.

In accordance with another aspect of the disclosure, a method performed by a base station is provided. The method comprises: transmitting, to a terminal, first information indicating that the base station supports a report of a remaining delivery time of an uplink data; and receiving, from the terminal, second information including an identity of a logical channel and information on a shortest remaining delivery time associated with the logical channel, wherein the shortest remaining delivery time for at least one uplink data in a buffer is less than a threshold for the logical channel.

In accordance with another aspect of the disclosure, a base station is provided. The base station comprises: a transceiver; and a controller coupled with the transceiver and configured to: transmit, to a terminal, first information indicating that the base station supports a report of a remaining delivery time of an uplink data, and receive, from the terminal, second information including an identity of a logical channel and information on a shortest remaining delivery time associated with the logical channel, wherein the shortest remaining delivery time for at least one uplink data in a buffer is less than a threshold for the logical channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
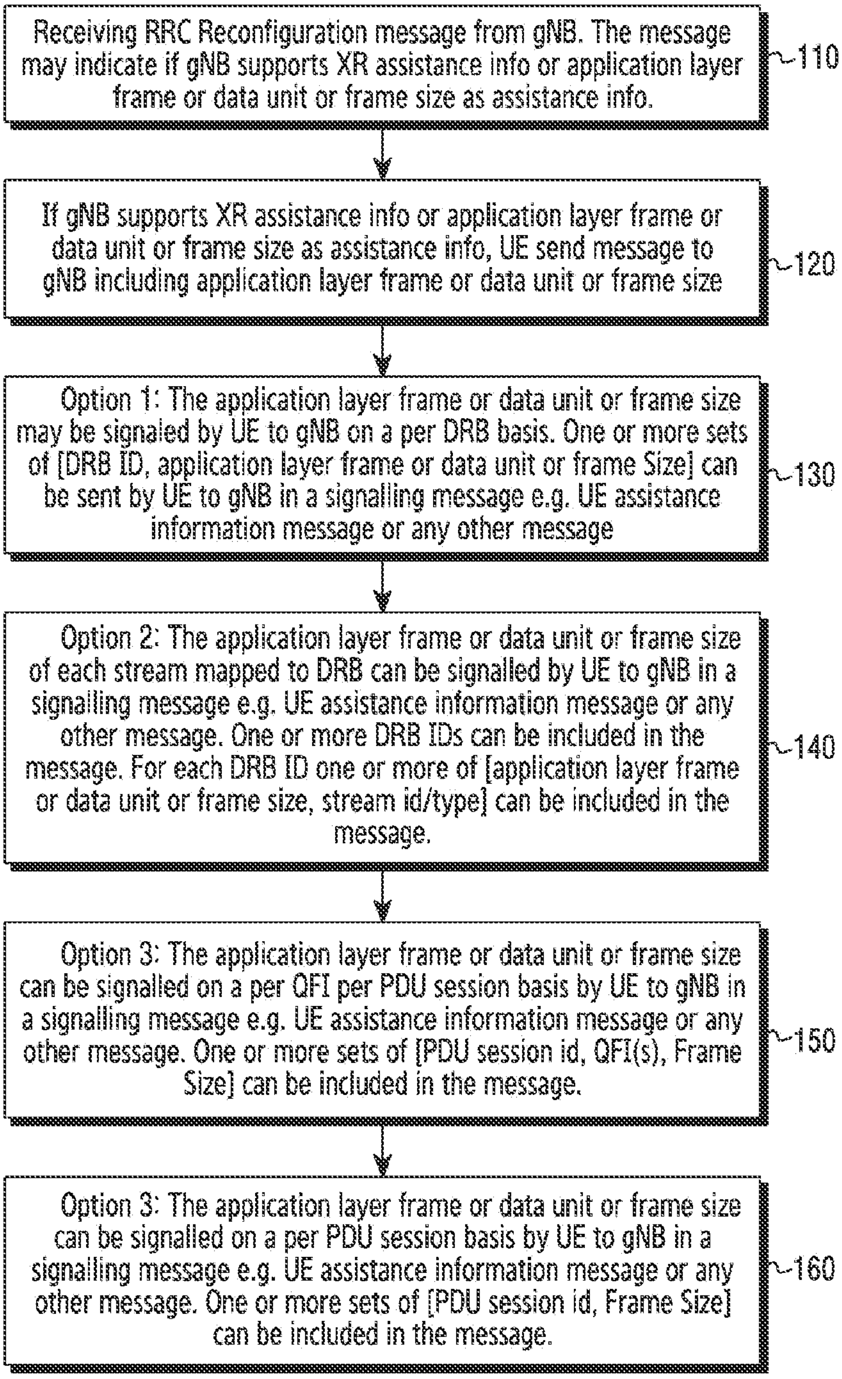
FIG. 1 illustrates an example of handling of assistance information for scheduling in accordance with an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

CA/Multi-connectivity in fifth generation wireless communication system: The fifth generation wireless communication system, supports standalone mode of operation as well dual connectivity (DC). In DC, a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports Multi-RAT dual connectivity (MR-DC) operation whereby a UE in radio resource control connected (RRC_CONNECTED) is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is an ng-eNB) or new radio (NR) access (i.e., if the node is a gNB).

In NR for a UE in RRC_CONNECTED not configured with CA/DC there is only one serving cell comprising of the primary cell. For a UE in RRC_CONNECTED configured with CA/DC the term "serving cells" is used to denote the set of cells comprising of the special cell(s) and all secondary cells. In NR, the term master cell group (MCG) refers to a group of serving cells associated with the master node, comprising of the primary cell (PCell) and optionally one or more secondary cells (SCells). In NR, the term secondary cell group (SCG) refers to a group of serving cells associated with the secondary node, comprising of the primary SCG cell (PSCell) and optionally one or more SCells.

In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the reconfiguration with sync procedure. For dual connectivity operation the term SpCell (i.e., Special Cell) refers to the PCell of the MCG or the PSCell of the SCG, otherwise the term special cell refers to the PCell.

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by a non-synchronized UE in RRC CONNECTED state. Several types of random access procedure is supported such as contention based random access, contention free random access and each of these can be one 2 step or 4 step random access.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring an RRC connected UE with BWP(s) and telling the UE which of the configured BWPs is currently the active one.

When BA is configured, the UE only may monitor physical downlink control channel (PDCCH) on the one active BWP i.e., it may not monitor PDCCH on the entire downlink (DL) frequency of the serving cell. In an RRC connected state, a UE is configured with one or more DL and uplink (UL) BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of random access procedure.

Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, a UE switches to the active DL BWP to the default DL BWP or initial DL BWP (if default DL BWP is not configured).

RRC states in fifth generation wireless communication system: In the fifth generation wireless communication system, RRC can be in one of the following states: RRC_IDLE, RRC_INACTIVE, and RRC_CONNECTED. A UE is either in an RRC_CONNECTED state or in an RRC_INACTIVE state when an RRC connection has been established. If this is not the case, i.e., no RRC connection is established, the UE is in an RRC_IDLE state. The RRC states can further be characterized as follows:

In the RRC_IDLE, a UE specific discontinuous (DRX) may be configured by upper layers. The UE monitors short messages transmitted with paging radio network temporary identifier (P-RNTI) over downlink control information (DCI); monitors a paging channel for core network (CN) paging using 5G-S-temporary mobile subscriber identity (5G-S-TMSI); performs neighboring cell measurements and cell (re-)selection; acquires system information and can send system information (SI) request (if configured); performs logging of available measurements together with location and time for logged measurement configured UEs.

In RRC_INACTIVE, a UE specific DRX may be configured by upper layers or by RRC layer; the UE stores the UE inactive access stratum (AS) context; a RAN-based notification area is configured by RRC layer. The UE monitors short messages transmitted with P-RNTI over DCI; monitors a paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from the UE takes place. The UE monitors short messages transmitted with P-RNTI over DCI, if configured; monitors control channels associated with the shared data channel to determine if data is scheduled for it; provides channel quality and feedback information; performs neighbouring cell measurements and measurement reporting; acquires system information.

PDCCH in fifth generation wireless communication system: In the fifth generation wireless communication system, PDCCH is used to schedule DL transmissions on physical downlink shared channel (PDSCH) and UL transmissions on physical uplink shared channel (PUSCH), where the DCI on PDCCH includes: Downlink assignments containing at least modulation and coding format, resource allocation, and hybrid-ARQ information related to downlink shared channel (DL-SCH); Uplink scheduling grants containing at least modulation and coding format, resource allocation, and hybrid-ARQ information related to uplink shared channel (UL-SCH).

In addition to scheduling, PDCCH can be used to for: Activation and deactivation of configured PUSCH transmission with configured grant; Activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for physical uplink control channel (PUCCH) and PUSCH; transmission of one or more TPC commands for sounding reference signal (SRS) transmissions by one or more UEs; switching a UE's active bandwidth part; initiating a random access procedure.

A UE monitors a set of PDCCH candidates in the configured monitoring occasions in one or more configured control resource SETs (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal DMRS. Quadrature phase shift keying (QPSK) modulation is used for PDCCH.

In fifth generation wireless communication system, a list of search space configurations is signaled by GNB for each configured BWP of serving cell wherein each search configuration is uniquely identified by a search space identifier. Search space identifier is unique amongst the BWPs of a serving cell. Identifier of search space configuration to be used for specific purpose such as paging reception, SI reception, random access response reception is explicitly signaled by a gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation 1 below:

$$(y^*(\text{number of slots in a radio frame})+x-\text{Monitoring-offset-PDCCH-slot})\bmod(\text{Monitoring-periodicity-PDCCH-slot})=0. \quad \text{[Equation 1]}$$

The starting symbol of a PDCCH monitoring occasion in each slot having PDCCH monitoring occasion is given by monitoring-symbols-PDCCH-within-slot. The length (in symbols) of a PDCCH monitoring occasion is given in the corset associated with the search space. search space configuration includes the identifier of coreset configuration associated with it. A list of coreset configurations is signaled by GNB for each configured BWP of serving cell wherein each coreset configuration is uniquely identified by an coreset identifier. CORESET identifier is unique amongst the BWPs of a serving cell. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR.

Each coreset configuration is associated with a list of TCI (Transmission configuration indicator) states. One DL reference signal (RS) ID (synchronization signal and physical broadcast channel block (SSB) or channel state information (CSI)-RS) is configured per TCI state. The list of TCI states corresponding to a coreset configuration is signaled by a gNB via RRC signaling. One of the TCI state in TCI state list is activated and indicated to a UE by a gNB. TCI state indicates the DL TX beam (DL TX beam is quasi collocated (QCLed) with SSB/CSI-RS of TCI state) used by GNB for transmission of PDCCH in the PDCCH monitoring occasions of a search space.

Downlink scheduling in fifth generation wireless communication system: in the downlink, the gNB can dynamically allocate resources to UEs via the cell radio network temporary identifier (C-RNTI) on PDCCH(s). A UE always monitors the PDCCH(s) in order to find possible assignments when the UE's downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using interruption radio network temporary identifier (INT-RNTI) on a PDCCH. If a UE receives the interrupted transmission indication, the UE may assume that no useful information to that UE was carried by the resource elements included in the indication, even if some of those resource elements were already scheduled to this UE.

In addition, with semi-persistent scheduling (SPS), the gNB can allocate downlink resources for the initial HARQ transmissions to UEs: RRC defines the periodicity of the configured downlink assignments while PDCCH addressed to configured scheduling radio network temporary identifier (CS-RNTI) can either signal and activate the configured downlink assignment, or deactivate it; i.e., a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell if they overlap in time. Otherwise, a downlink reception according to the configured downlink assignment is assumed, if activated. The UE may be configured with up to 8 active configured downlink assignments for a given BWP of a serving cell. When more than one is configured:

- The network decides which of these configured downlink assignments are active at a time (including all of them); or
- Each configured downlink assignment is activated separately using a DCI command and deactivation of configured downlink assignments is done using a DCI command, which can either deactivate a single configured downlink assignment or multiple configured downlink assignments jointly.

Uplink scheduling in fifth generation wireless communication system: In the uplink, the gNB can dynamically allocate resources to UEs via the C-RNTI on PDCCH(s). A UE always monitors the PDCCH(s) in order to find possible grants for uplink transmission when the UE's downlink reception is enabled (activity governed by DRX when configured). When CA is configured, the same C-RNTI applies to all serving cells.

The gNB may cancel a PUSCH transmission, or a repetition of a PUSCH transmission, or an SRS transmission of a UE for another UE with a latency-critical transmission. The gNB can configure UEs to monitor cancelled transmission indications using cancellation indication radio network temporary identifier (CI-RNTI) on a PDCCH. If a UE receives the cancelled transmission indication, the UE may cancel the PUSCH transmission from the earliest symbol overlapped with the resource or the SRS transmission overlapped with the resource indicated by cancellation. In addition, with Configured Grants, the gNB can allocate uplink resources for the initial HARQ transmissions and HARQ retransmissions to UEs. Two types of configured uplink grants are defined:

With Type 1, RRC directly provides the configured uplink grant (including the periodicity); and With Type 2, RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell if they overlap in time. Otherwise, an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC PDUs associated with the overlapping resources.

Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC protocol data unit (PDU) associated with the overlapping resource. In case the MAC PDU associated with a deprioritized transmission has already been generated, the UE keeps the MAC PDU stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When supplementary uplink (SUL) is configured, the network should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signalling. The dynamically indicated number of repetitions may override the RRC configured number of repetitions, if both are present.

Embodiment 1

The eXtended Reality (XR) is a term for different types of realities and refers to all real-and-virtual combined environments and human-machine interactions generated by computer technology and wearables. It includes following representative forms and the areas interpolated among them: Augmented Reality (AR); Mixed Reality (MR); Virtual Reality (VR).

Many of the XR use cases are characterized by quasi-periodic traffic (with possible jitter) with high data rate in DL (i.e., video steam) combined with the frequent UL (i.e., pose/control update) and/or UL video stream. Both DL and UL traffic are also characterized by relatively strict packet delay budget (PDB). Hence, there is a need for solutions to better support such challenging services.

In case of applications/services such as XR, one application layer frame or data unit (also referred as PDU set) can consist of multiple IP packets. PDU set can be one or more PDUs carrying the payload of one unit of information generated at the application level. Some information can be useful for a gNB scheduler to enhance the capacity to support XR services, such as the remaining delivery time of the frame or data unit (or PDU set), the size of the frame or data unit (or, PDU set), the size of the already sent part of the frame or data unit (or, PDU set), the size of playout buffer at application layer, etc.

[Method 1-1]

FIG. 1 illustrates an example of handling of assistance information for scheduling in accordance with an embodiment of the present disclosure.

The size of the application layer frame or data unit or frame (or PDU set) is not fixed and can be different for different XR application and can be different for different stream of same XR application.

In an embodiment according to this method of disclosure, a UE assistance information message can be used to signal the size of application layer frame or data unit or frame (or PDU set) by a UE to a gNB. The UE can send this information in an RRC_CONNECTED state.

In an embodiment, the application layer frame or data unit or frame (or PDU set) size can be signalled by a UE to a gNB on a per data radio bearer (DRB) basis. One or more sets of

[DRB ID, application layer frame or data unit or frame Size] can be sent by the UE to the gNB in a signalling message e.g., the UE assistance information message or any other message (130). In an embodiment instead of DRB ID, logical channel (LCH) ID can be included.

In an embodiment, if a DRB is mapped to multiple XR streams each having different application layer frame or data unit or frame (or PDU set) size, application layer frame or data unit or frame (or PDU set) size of each stream mapped to DRB can be signalled by a UE to a gNB in a signalling message e.g., the UE assistance information message or any other message. One or more DRB IDs can be included in the message. For each DRB ID one or more of [application layer frame or data unit or frame (or PDU set) size, stream id/type] can be included in the message (140).

In an embodiment, application layer frame or data unit or frame (or PDU set) size can be signalled on a per QoS flow identifier (QFI) per PDU session basis by a UE to a gNB in a signalling message e.g., a UE assistance information message or any other message. One or more sets of [PDU session id, QFI(s), Frame Size] can be included in the message (150).

In an embodiment, application layer frame or data unit or frame (or PDU set) size can be signalled on a per PDU session basis by a UE to a gNB in a signalling message e.g., a UE assistance information message or any other message. One or more sets of [PDU session id, Frame Size] can be included in the message (160).

A UE can receive the application layer frame or data unit or frame (or PDU set) size per QFI and/or PDU session or per DRB ID from upper layer.

In an embodiment, a gNB can indicate in RRC signalling (e.g., RRC reconfiguration message) if the gNB supports XR assistance info or application layer frame or data unit or frame (or PDU set) size as assistance info (110). If supported, a UE indicates in a UE assistance information message (or any other signalling message), application layer frame or data unit or frame (or PDU set) size as explained earlier (120). The UE can send a UE assistance information message (or any other signalling message) with application layer frame or data unit or frame (or PDU set) size as explained earlier whenever such information changes as shown in FIG. 1 (130, 140, 150, 160). Upon handover (or reconfiguration with sync) to target cell, if target cell supports XR assistance info or application layer frame or data unit or frame (or, PDU set) size as assistance info as indicated in an RRC reconfiguration message with handover command or reconfiguration with sync from source cell, the UE can send a UE assistance information message (or any other signalling message) with application layer frame or data unit or frame (or, PDU set) size as explained earlier if the UE has sent the information to source cell in last Is of handover (or reconfiguration with sync).

In an embodiment, a gNB can request to a UE for XR assistance info or application layer frame or data unit or frame (or PDU set) size as assistance info. The request can be included in an RRC signalling message e.g., an RRC reconfiguration message. Upon receiving request, the UE send a signalling message (e.g., a UE assistance information message) including application layer frame or data unit or frame (or PDU set) size as explained earlier.

In an embodiment, if source cell has received a UE assistance information message (or any other signalling message) with application layer frame or data unit or frame (or PDU set) size as explained earlier, source cell may send this information to target cell during handover preparation (over X2/Xn interface in a handover preparation message). Target cell can then use this information for scheduling.

In an alternate embodiment, application layer frame or data unit or frame size can be signalled to a gNB using MAC control element (CE) instead of a signalling message. The information included is same as explained earlier.

[Method 1-2]

Figure 2:
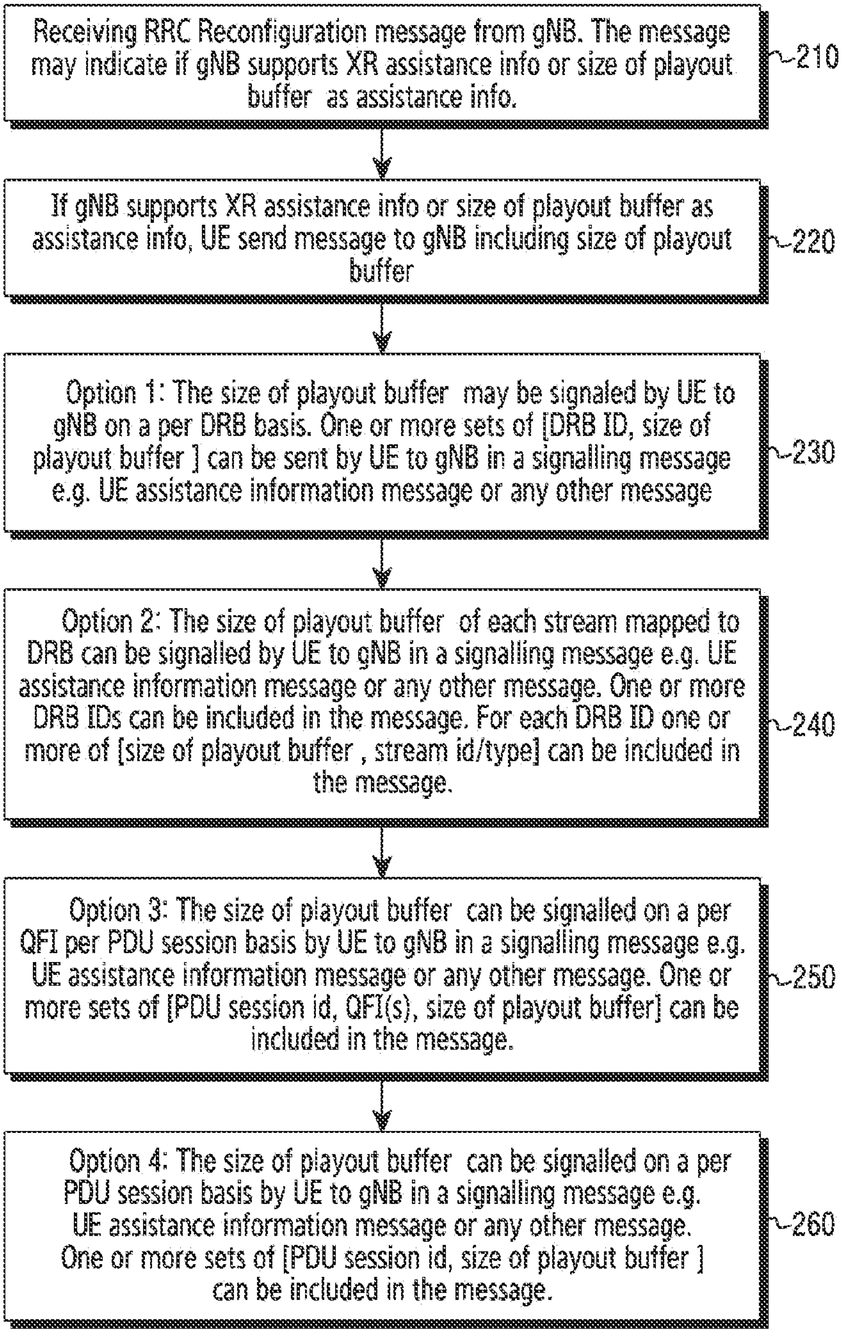
FIG. 2 illustrates another example of handling of assistance information for scheduling in accordance with another embodiment of the present disclosure.

FIG. 2 illustrates an example of handling of assistance information for scheduling in accordance with another embodiment of the present disclosure.

If the size of playout buffer is fed back from a UE and known at a gNB, then, additional PDB could be used for packet scheduling, which could give the gNB more time to schedule the UE within the delay budget requirements of the XR service and more likely to successfully transmit packets with link adaptation gain.

In an embodiment according to this method of disclosure, a UE assistance information message can be used to signal the size of playout buffer by a UE to a gNB. The UE can send this information in an RRC_CONNECTED state.

In an embodiment, the size of playout buffer can be signalled by a UE to a gNB on a per DRB basis or per group of DRBs. One or more sets of [DRB ID(s), size of playout buffer] can be sent by the UE to the gNB in a signalling message e.g., a UE assistance information message or any other message (230).

In an embodiment, if a DRB is mapped to multiple XR streams each having different playout buffer, size of playout buffer of each stream mapped to DRB can be signalled by a UE to a gNB in a signalling message e.g., a UE assistance information message or any other message. One or more DRB IDs can be included in the message. For each DRB ID one or more of [size of playout buffer, stream id/type] can be included in the message (240).

In an embodiment, size of playout buffer can be signalled on a per QFI per PDU session basis by a UE to a gNB in a signalling message e.g., a UE assistance information message or any other message. One or more sets of [PDU session id, QFI(s), size of playout buffer] can be included in the message (250).

In an embodiment, size of playout buffer can be signalled on a per PDU session basis by a UE to a gNB in a signalling message e.g., a UE assistance information message or any other message. One or more sets of [PDU session id, size of playout buffer] can be included in the message (260).

A UE can receive the size of playout buffer per QFI and/or PDU session or per DRB ID from upper layer.

In an embodiment, a gNB can indicate in RRC signalling (e.g., RRC reconfiguration message) if the gNB supports XR assistance info or size of playout buffer as assistance info (210). If supported, a UE indicates in a UE assistance information message (or any other message), size of playout buffer as explained earlier (220). The UE can send a UE assistance information message (or any other message) with size of playout buffer as explained earlier whenever such information message change as shown in FIG. 2 (230, 240, 250, 260). The UE can send a UE assistance information message (or any other message) with size of playout buffer as explained earlier when the amount of packets in the playout buffer become more or less than a certain threshold. Threshold can be configured by the gNB in RRC signalling e.g., an RRC reconfiguration message or system information. Threshold can be per BWP or per cell or per cell group (CG).

In an embodiment, upon handover (or reconfiguration with sync) to target cell, if target cell supports XR assistance info or size of playout buffer as assistance info as indicated in an RRC reconfiguration message with handover command or reconfiguration with sync from source cell, a UE can send a UE assistance information message (or any other signalling message) with size of playout buffer as explained earlier if the UE has sent the information to source cell in last Is of handover (or reconfiguration with sync).

In an embodiment, a gNB can request to a UE for XR assistance info or size of playout buffer as assistance info. The request can be included in an RRC signalling message e.g., an RRC reconfiguration message. Upon receiving a request, the UE send a signalling message including size of playout buffer as explained earlier.

In an embodiment, if source cell has received a UE assistance information message (or any other signalling message) with size of playout buffer as explained earlier, source cell may send this information to target cell during handover preparation (over X2/Xn interface in a handover preparation message). Target cell can then use this information for scheduling.

In an alternate embodiment, size of playout buffer can be signalled to a gNB using MAC CE instead of a signalling message. The information included is same as explained earlier.

[Method 1-3]

Figure 3:
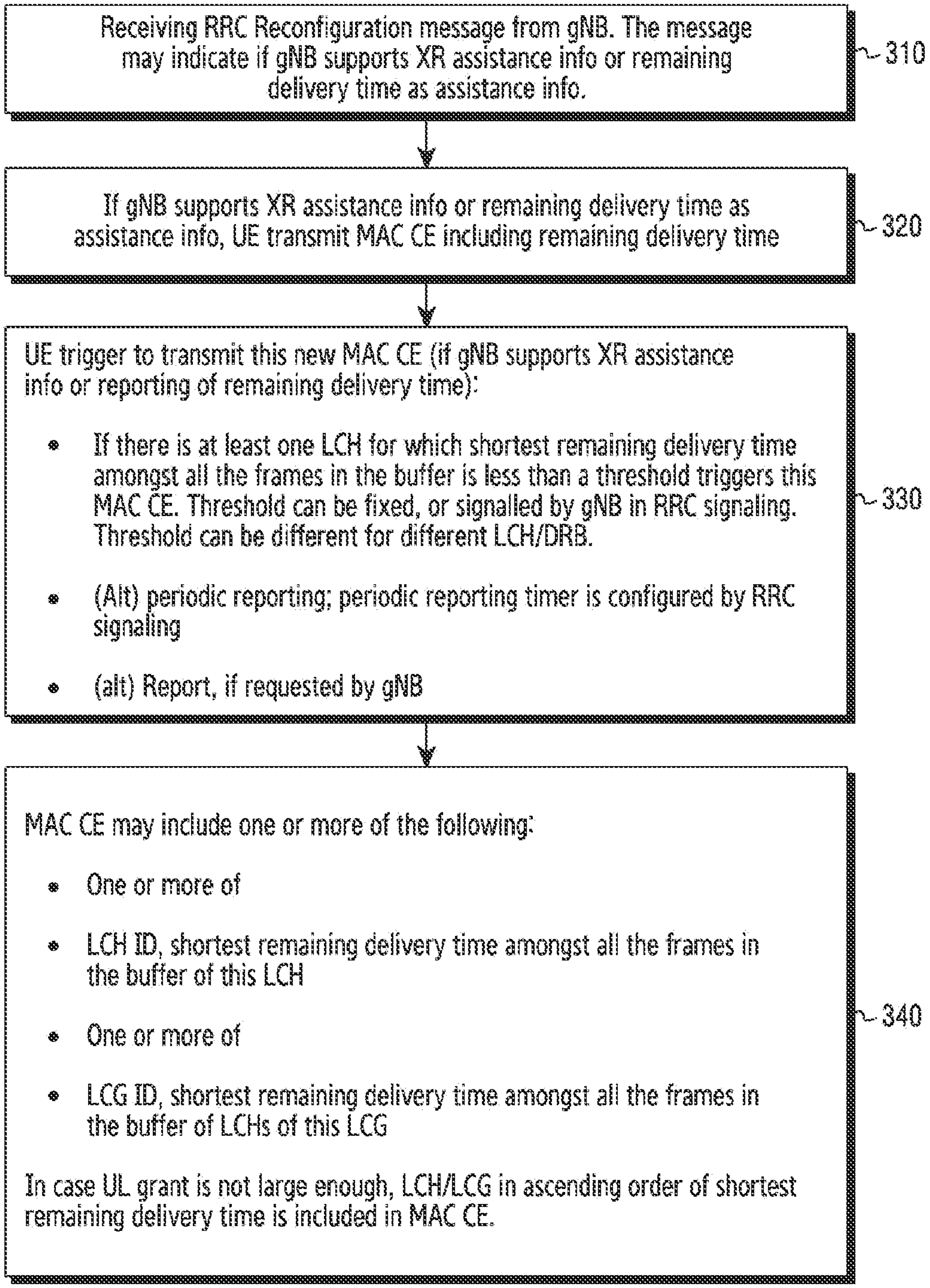
FIG. 3 illustrates yet another example of handling of assistance information for scheduling in accordance with another embodiment of the present disclosure.

FIG. 3 illustrates an example of handling of assistance information for scheduling in accordance with another embodiment of the present disclosure.

In an embodiment according to this method of disclosure, a MAC CE can be used to report remaining delivery time of application layer frame or data unit or frame (or PDU set) or PDU to be transmitted in uplink. MAC CE may include one or more of the following (340):

One or more of

LCH ID, shortest remaining delivery time amongst all the frames (or PDU sets) in the buffer of this LCH; or One or more of LCG ID, shortest remaining delivery time amongst all the frames (or PDU sets) or PDU or packet/data in the buffer of LCHs of this LCG.

In case UL grant is not large enough, LCH/logical channel group (LCG) in ascending order of shortest remaining delivery time is included in MAC CE.

In the above operation, remaining delivery time of UL data corresponding to a logical channel is the smallest remaining delivery time amongst all the UL data of that logical channel. Remaining delivery time for a packet/data is basically "PDB (or PDU set delay budget i.e., PSDB)—time elapsed since the data/packet arrived in buffer (e.g., packet data convergence protocol (PDCP) buffer or L2 buffer)." Note that discard timer is started when data/packet arrive in PDCP buffer. The value of discard timer is equal to PDB or PSDB and discard timer expires after this time.

For example, if discard timer starts at time T and value of discard timer is 100 ms, discard timer will expire at T+100 ms. So remaining delivery time for a packet/data is basically the time elapsed since the discard timer for packet/data is started. A UE may calculate the remaining delivery time at the time the MAC CE is generated or the UE may calculate the remaining delivery time with respect to time the MAC CE including the remaining delivery time will be transmitted in the UL grant. Alternately, remaining delivery time for a packet/data is basically "PDB (or PDU set delay budget i.e., PSDB)—time elapsed since the data/packet arrived in non-access stratum (NAS) buffer." Alternately, remaining delivery time for a packet/data is basically "PDB (or PDU set delay budget i.e., PSDB)—time elapsed since the data/packet is generated by application layer."

In an embodiment according to this method of disclosure, a UE triggers to transmit the MAC CE including remaining delivery time (if a gNB supports XR assistance info or reporting of remaining delivery time) (310, 320, 330):

If there is at least one LCH for which shortest remaining delivery time amongst all the frames (or PDU sets) or PDU or packet/data in the buffer is less than a threshold triggers this MAC CE. Threshold can be fixed, or signalled by a gNB in RRC signaling. Threshold can be different for different LCH/DRB.

(Alt) periodic reporting; periodic reporting timer is configured by RRC signaling; and (Alt) Report, if requested by a gNB.

In an embodiment, two MAC CEs can be defined wherein first MAC CE only includes information about only one LCH or LCG and second MAC CE includes information about one or more LCHs or LCGs. LCH ID to identify these MAC CEs are reserved and different.

In an embodiment, information about the amount/size of data that should be delivered within the remaining delivery time can also be added in MAC CE. This can help a gNB to figure out not only the remaining time but also the amount of UL grant required to service the frame or PDU set or PDU or packet/data within remaining time.

In an alternate embodiment, remaining delivery time of LCH(s) or LCG(s) DRB (s) or PDU session(s) can be signalled to a gNB using an RRC signaling message instead of MAC CE. The information included is same as explained earlier. In an alternate embodiment, PDCP control PDU or service data adaptation protocol (SDAP) control PDU can also carry this information.

In an embodiment, upon handover (or reconfiguration with sync) to target cell, if target cell supports XR assistance info or remaining delivery time as assistance info as indicated in an RRC reconfiguration message with handover command or reconfiguration with sync from source cell, a UE can send information about remaining delivery time as explained earlier if the UE has sent the information to source cell in last is of handover (or reconfiguration with sync).

In an embodiment, a gNB can request to a UE for XR assistance info or remaining delivery time as assistance info. The request can be included in an RRC signalling message e.g., an RRC reconfiguration message. Upon receiving request, the UE send information about remaining delivery time as explained earlier.

In an embodiment, if source cell has received information about remaining delivery time as explained earlier from a UE, source cell may send this information to target cell during handover preparation (over X2/Xn interface in a handover preparation message). Target cell can then use this information for scheduling.

Embodiment 2—Method and Apparatus for Enhanced Scheduling Request in Wireless Communication System DRX in fifth generation wireless communication system: In 5G wireless communication system, the PDCCH monitoring activity of the UE in RRC connected mode is governed by DRX, BA and DCP (i.e., DCI with cyclic redundancy check (CRC) scrambled by power saving radio network temporary identifier (PS-RNTI)). When DRX is configured, the UE may not continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which the UE can go back to sleep. The UE may restart the inactivity timer following a single successful decoding of a PDCCH for a first transmission only (i.e., not for retransmissions);

retransmission-timer: duration until a retransmission can be expected;

cycle: specifies the periodic repetition of the on-duration followed by a possible period of inactivity; and/or active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Logical channel prioritization (LCP) in fifth generation wireless communication system: In NR, the UE has an uplink rate control function which manages the sharing of uplink resources between logical channels. RRC controls the uplink rate control function by giving each logical channel a priority, a prioritized bit rate (PBR), and a buffer size duration (BSD). In addition, mapping restrictions can be configured. With LCP restrictions in MAC, RRC can restrict the mapping of a logical channel to a subset of the configured cells, numerologies, PUSCH transmission durations, configured grant configurations and control whether a logical channel can utilize the resources allocated by a Type 1 Configured Grant or whether a logical channel can utilize dynamic grants indicating a certain physical priority level. With such restrictions, it then becomes possible to reserve, for instance, the numerology with the largest subcarrier spacing and/or shortest PUSCH transmission duration for URLLC services. Furthermore, RRC can associate logical channels with different scheduling request (SR) configurations, for instance, to provide more frequent SR opportunities to URLLC services. The uplink rate control function ensures that the UE serves the logical channel(s) in the following sequence:

1. All relevant logical channels in decreasing priority order up to their PBR; and
2. All relevant logical channels in decreasing priority order for the remaining resources assigned by the grant.

In case the PBRs are all set to zero, the first step is skipped and the logical channels are served in strict priority order: the UE maximizes the transmission of higher priority data.

The mapping restrictions tell the UE which logical channels are relevant for the grant received. If no mapping restrictions are configured, all logical channels are considered.

If more than one logical channel has the same priority, the UE may serve them equally.

Buffer status reporting in fifth generation wireless communication system: In NR, the Buffer status report (BSR) procedure is used to provide the serving gNB with information about UL data volume in the MAC entity. RRC configures the following parameters to control the BSR:

periodicBSR-Timer;
retxBSR-Timer;
logicalChannelSR-DelayTimerApplied;
logicalChannelSR-DelayTimer;
logicalChannelSR-Mask; and
logicalChannelGroup.

Each logical channel may be allocated to an LCG using the logicalChannelGroup. The maximum number of LCGs is eight. A BSR may be triggered if any of the following events occur:

UL data, for a logical channel which belongs to an LCG, becomes available to the MAC entity; and either:

this UL data belongs to a logical channel with higher priority than the priority of any logical channel containing available UL data which belong to any LCG; or none of the logical channels which belong to an LCG contains any available UL data;

in which case the BSR is referred below to as "regular BSR";

UL resources are allocated and number of padding bits is equal to or larger than the size of the buffer status report MAC CE plus its subheader, in which case the BSR is referred below to as "padding BSR";

retxBSR-Timer expires, and at least one of the logical channels which belong to an LCG contains UL data, in which case the BSR is referred below to as "regular BSR"; and periodicBSR-Timer expires, in which case the BSR is referred below to as "Periodic BSR."

For Regular BSR, the MAC entity may:

1> if the BSR is triggered for a logical channel for which logicalChannelSR-DelayTimerApplied with value true is configured by upper layers:

2> start or restart the logicalChannelSR-DelayTimer.

1> else:

2> if running, stop the logicalChannelSR-DelayTimer.

For Regular and Periodic BSR, the MAC entity may:

1> if more than one LCG has data available for transmission when the MAC PDU containing the BSR is to be built:

2> report Long BSR for all LCGs which have data available for transmission.

1> else:

2> report Short BSR.

For Padding BSR, the MAC entity may:

1> if the number of padding bits is equal to or larger than the size of the Short BSR plus its subheader but smaller than the size of the Long BSR plus its subheader:

2> if more than one LCG has data available for transmission when the BSR is to be built:

3> if the number of padding bits is equal to the size of the Short BSR plus its subheader:

4> report Short Truncated BSR of the LCG with the highest priority logical channel with data available for transmission.

3> else:

4> report long truncated BSR of the LCG(s) with the logical channels having data available for transmission following a decreasing order of the highest priority logical channel (with or without data available for transmission) in each of these LCG(s), and in case of equal priority, in increasing order of LCGID.

2> else:

3> report Short BSR.

1> else if the number of padding bits is equal to or larger than the size of the Long BSR plus its subheader:

2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity may:

1> if the buffer status reporting procedure determines that at least one BSR has been triggered and not cancelled:

2> if UL-SCH resources are available for a new transmission and the UL-SCH resources can accommodate the BSR MAC CE plus its subheader as a result of logical channel prioritization:

3> instruct the multiplexing and assembly procedure to generate the BSR MAC CE(s);

3> start or restart periodicBSR-Timer except when all the generated BSRs are long or short Truncated BSRs;

3> start or restart retxBSR-Timer.

2> if a regular BSR has been triggered and logicalChannelSR-DelayTimer is not running:

3> if there is no UL-SCH resource available for a new transmission; or

3> if the MAC entity is configured with configured uplink grant(s) and the regular BSR was triggered for a logical channel for which logicalChannelSR-Mask is set to false; or 3> if the UL-SCH resources available for a new transmission do not meet the LCP mapping restrictions configured for the logical channel that triggered the BSR:

4> trigger a scheduling request.

A MAC PDU may contain at most one BSR MAC CE, even when multiple events have triggered a BSR. The regular BSR and the Periodic BSR may have precedence over the padding BSR.

The MAC entity may restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly may be cancelled when a MAC PDU is transmitted and this PDU includes a long or Short BSR MAC CE which contains buffer status up to (and including) the last event that triggered a BSR prior to the MAC PDU assembly.

Meanwhile, a UE can perform transmission and reception in active time. Outside the active time, if UL data arrives, the UE triggers BSR. BSR triggers SR. While SR is pending, the UE is considered in active time and monitors PDCCH for UL grant. In UL grant, the UE transmits and further monitors PDCCH for retransmissions. Outside the active time, if UL data arrives, the UE can also CG is available/applicable for available data. The UE further monitors PDCCH for retransmissions. The UL data arrival outside active time, increases UE's power consumption. So enhanced method of scheduling is needed.

[Method 2-1]

Figure 4:
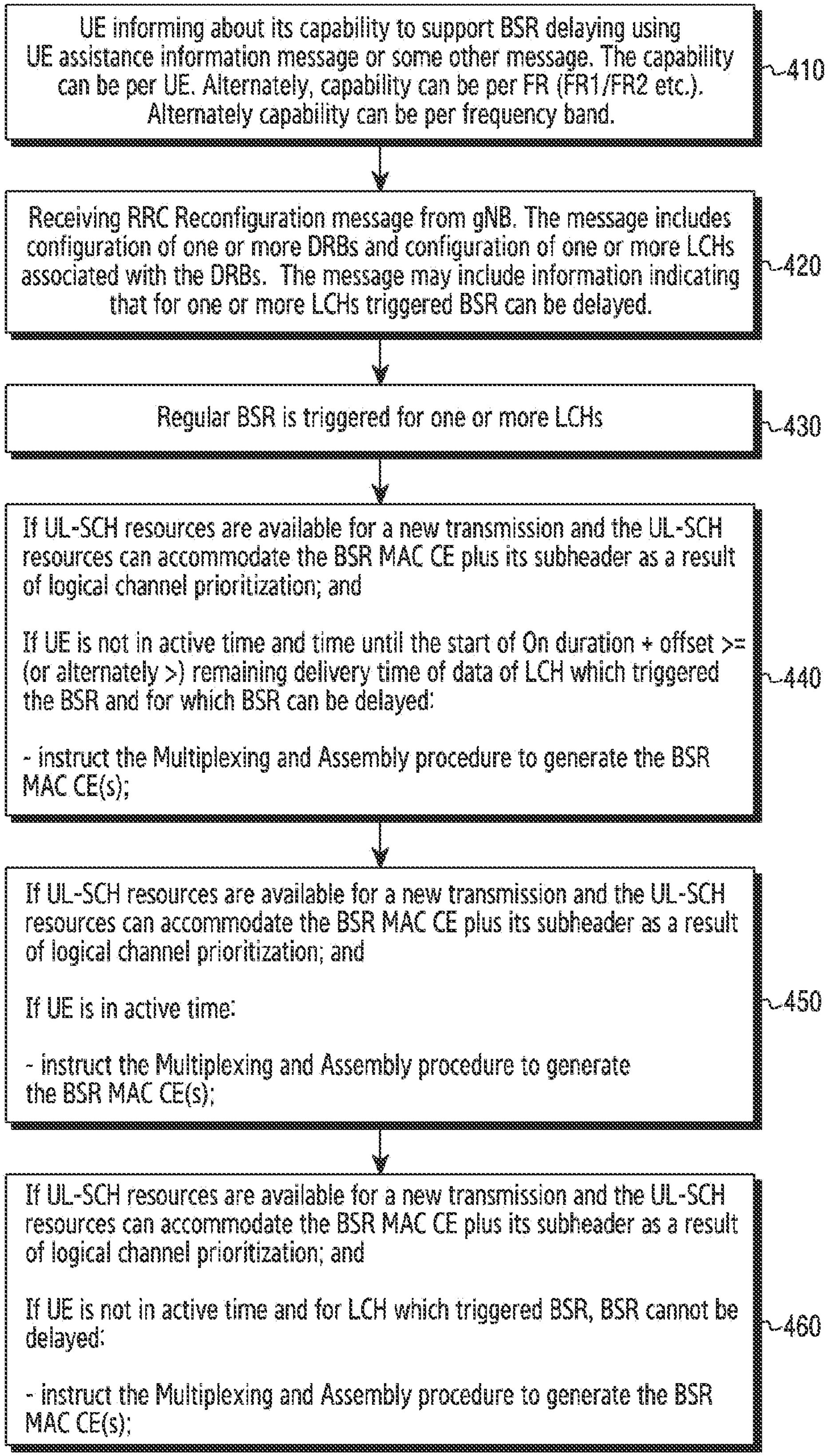
FIG. 4 illustrates an example of enhanced scheduling request in accordance with an embodiment of the present disclosure.
Figure 5:
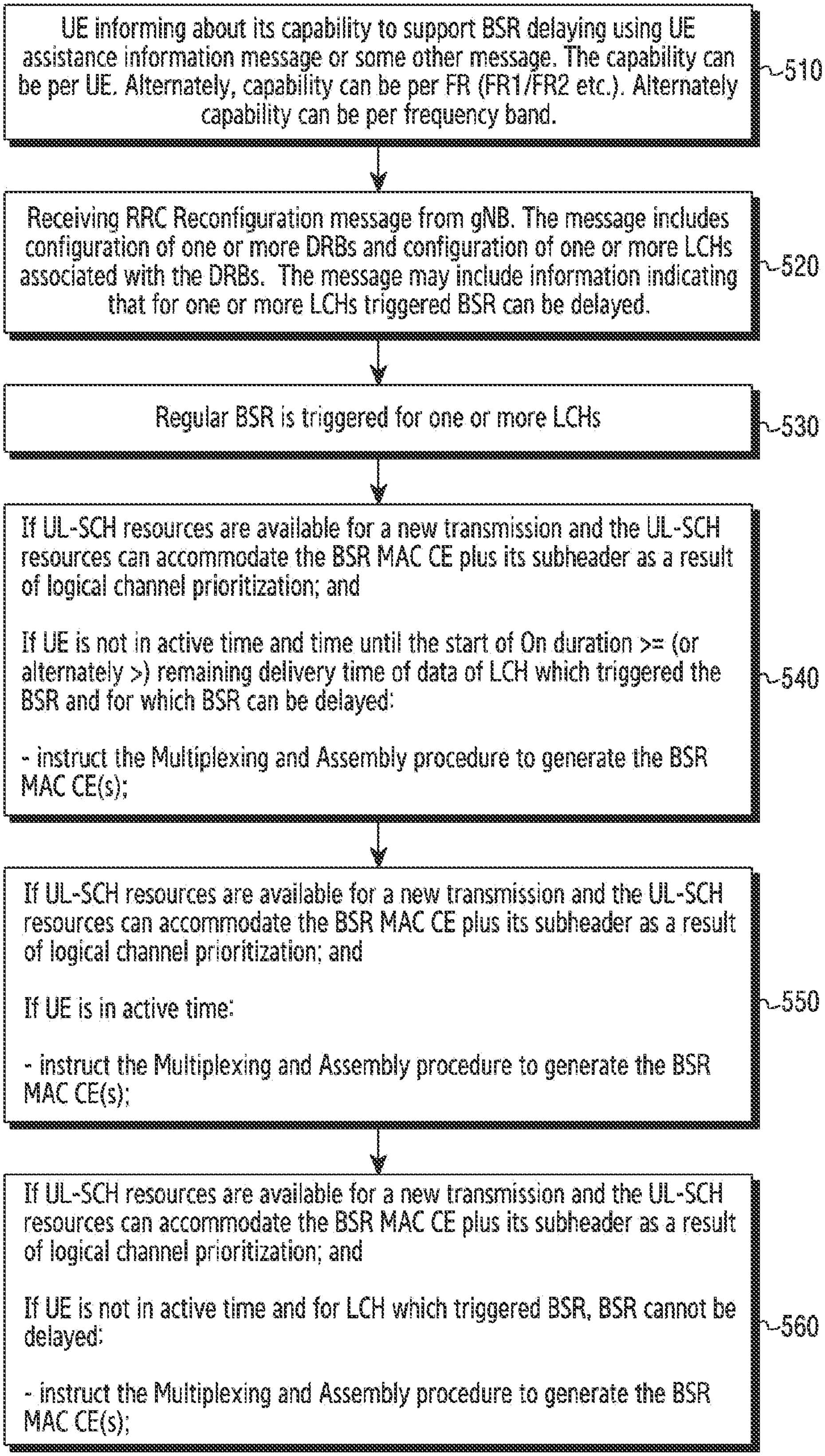
FIG. 5 illustrates another example of enhanced scheduling request in accordance with another embodiment of the present disclosure.

FIG. 4 and FIG. 5 illustrate examples of enhanced scheduling request in accordance with embodiments of the present disclosure.

In an embodiment according to this method of disclosure, it is provided that network (i.e., gNB) can indicate for one or more LCHs that triggered BSR can be delayed. The indication can be signalled in an RRC reconfiguration message or system information (420, 520). The indication can be per LCH or per LCG or per CG. If indication is per CG, BSR triggered by all LCHs of CG can be delayed. If indication is per LCG, BSR triggered by all LCHs of that LCG can be delayed. Note that mapping between LCG and LCHs is signalled by a gNB in an RRC reconfiguration message. A UE may inform about its capability to support BSR delaying using a UE assistance information message or some other message. The capability can be per UE. Alternately, capability can be per frequency range (FR) (FR1/FR2 etc.). Alternately capability can be per frequency band (410, 510).

If data arrive for one such LCH (i.e., LCH for which BSR can be delayed) while a UE is not in active time (active time is defined earlier in this disclosure) and BSR triggering condition (defined earlier in this disclosure) is met (i.e., regular BSR is triggered for one or more LCHs) (430, 530), a UE/MAC entity in the UE perform the following operation:

If time until the start of On duration+offset<(or alternately<=) remaining delivery time of data of this LCH a UE does not trigger BSR/SR until the start of on duration (or a UE does not instruct the Multiplexing and Assembly procedure to generate the BSR MAC CE(s) or trigger SR until the start of on duration)

Else a UE trigger BSR/SR (or a UE instructs the multiplexing and Assembly procedure to generate the BSR MAC CE(s) or trigger SR) (440).

Note that an offset is for taking into account the potential scheduling delay. It can be pre-defined or signalled in an RRC reconfiguration message. It can be signalled per CG or per cell or per BWP.

(Alternately) If data arrive for one such LCH (i.e., LCH for which BSR can be delayed) while a UE is not in active time and BSR triggering condition is met, a UE/MAC entity in the UE perform the following operation:

If time until the start of On duration<(or alternately<=) remaining delivery time of data of this LCH a UE does not trigger BSR/SR until the start of on duration (or a UE does not instruct the Multiplexing and Assembly procedure to generate the BSR MAC CE(s) or trigger SR until the start of on duration);

Else a UE triggers BSR/SR (or a UE instructs the multiplexing and assembly procedure to generate the BSR MAC CE(s) or trigger SR)

(Alternately, according to FIG. 4) The MAC entity may:

1> if the buffer status reporting procedure (as explained earlier) determines that at least one BSR has been triggered and not cancelled:

2> if UL-SCH resources are available for a new transmission and the UL-SCH resources can accommodate the BSR MAC CE plus its subheader as a result of logical channel prioritization; and 2> If a UE is not in active time and time until the start of on duration+offset>=(or alternately>) remaining delivery time of data of the LCH which triggered the BSR and for which BSR can be delayed; or if the UE is in active time; or If the UE is not in active time and for LCH which triggered BSR, BSR cannot be delayed:

3> instruct the multiplexing and assembly procedure to generate the BSR MAC CE(s) (450, 460, 550, 560);

3> start or restart periodicBSR-Timer except when all the generated BSRs are long or short truncated BSRs; and 3> start or restart retxBSR-Timer.

Note that offset is for taking into account the potential scheduling delay. It can be pre-defined or signalled in an RRC reconfiguration message. It can be signalled per CG or per cell or per BWP.

(Alternately, according to FIG. 5) The MAC entity may:

1> if the buffer status reporting procedure (as explained earlier) determines that at least one BSR has been triggered and not cancelled:

2> if UL-SCH resources are available for a new transmission and the UL-SCH resources can accommodate the BSR MAC CE plus its subheader as a result of logical channel prioritization; and 2> If the UE is not in active time and time until the start of on duration>=(or alternately>) remaining delivery time of data of LCH which triggered the BSR and for which BSR can be delayed; or if the UE is in active time; or If the UE is not in active time and for LCH which triggered BSR, BSR cannot be delayed:

3> instruct the multiplexing and assembly procedure to generate the BSR MAC CE(s) (540);

3> start or restart periodicBSR-Timer except when all the generated BSRs are long or short Truncated BSRs;

3> start or restart retxBSR-Timer.

In the operation in this method, remaining delivery time of UL data corresponding to a logical channel is the smallest remaining delivery time amongst all the UL data of that logical channel. In case where LCHs with PDB and LCHs without PDB exist together, then, the remaining delivery time of the LCHs without PDB as infinity is considered. Remaining delivery time for a packet/data is basically "PDB—time elapsed since the data/packet arrived in buffer (e.g., PDCP buffer or L2 buffer)." Alternately, remaining delivery time for a packet/data is basically "PDB—time elapsed since the data/packet arrived in NAS buffer." Alternately, remaining delivery time for a packet/data is basically "PDB—time elapsed since the data/packet is generated by application layer."

(Alternately) The MAC entity may:

1> if the buffer status reporting procedure (as explained earlier) determines that at least one BSR has been triggered and not cancelled:

2> if UL-SCH resources are available for a new transmission and the UL-SCH resources can accommodate the BSR MAC CE plus its subheader as a result of logical channel prioritization; and 2> If the UE is not in active time and for LCH which triggered BSR, BSR cannot be delayed; or if the UE is in active time:

3> instruct the multiplexing and assembly procedure to generate the BSR MAC CE(s);

3> start or restart periodicBSR-Timer except when all the generated BSRs are long or short truncated BSRs;

3> start or restart retxBSR-Timer.

[Method 2-2]

Figure 6:
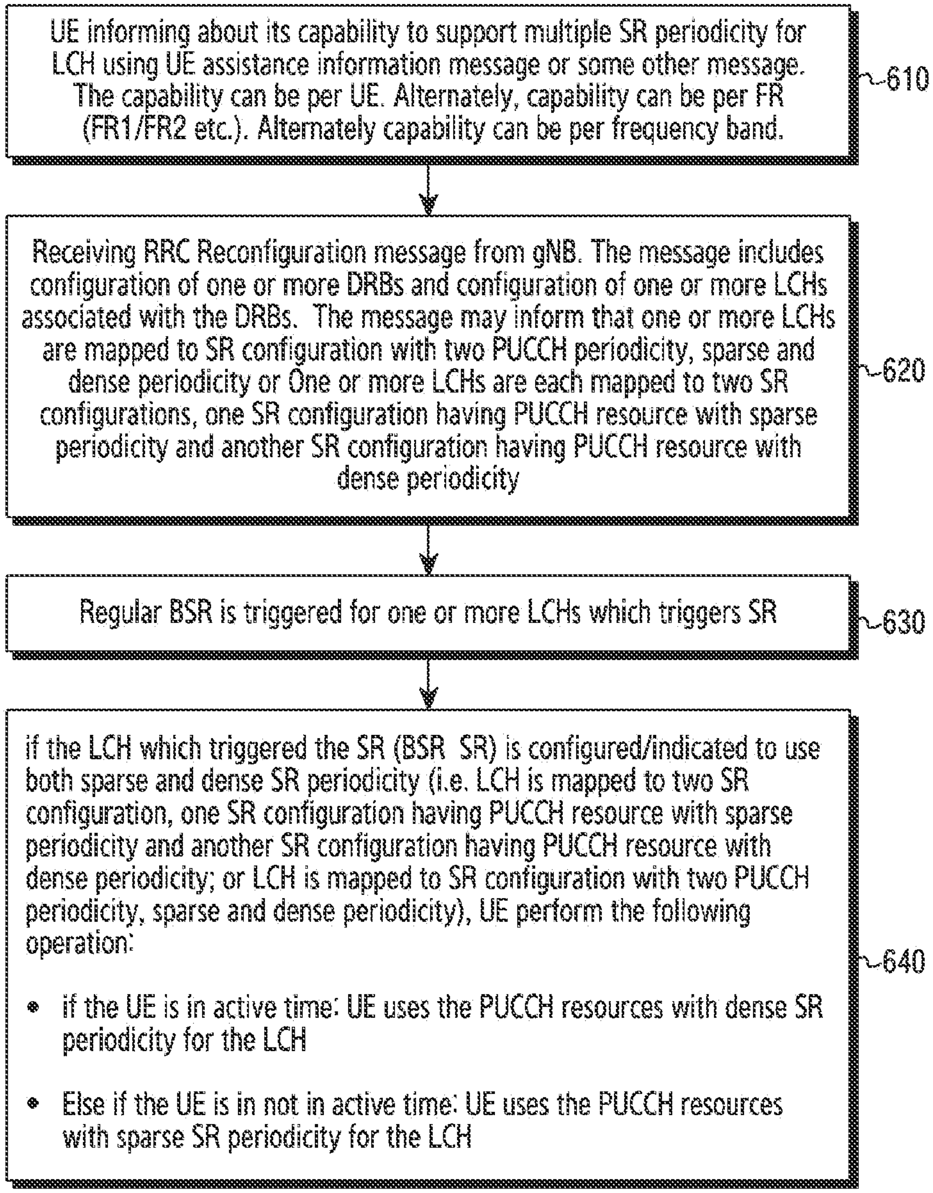
FIG. 6 illustrates another example of enhanced scheduling request in accordance with another embodiment of the present disclosure.

FIG. 6 illustrates an example of enhanced scheduling request in accordance with another embodiment of the present disclosure.

In an embodiment according to this method of disclosure, it is provided that two SR periodicity are configured by RRC signaling (e.g., RRC reconfiguration message), sparse (PUCCH resources occur at longer periodicity) and dense (PUCCH resources occur at shorter periodicity). A UE may inform about its capability to support multiple SR periodicity for a LCH using a UE assistance information message or some other message. The capability can be per UE. Alternately, capability can be per FR (FR1/FR2 etc.). Alternately capability can be per frequency band (610).

One or more LCHs are mapped to SR configuration with two PUCCH periodicity, sparse and dense periodicity; mapping is signaled by a gNB in an RRC reconfiguration message.

One or more LCHs are each mapped to two SR configurations, one SR configuration having PUCCH resource with sparse periodicity and another SR configuration having PUCCH resource with dense periodicity. Mapping is signaled by a gNB in an RRC reconfiguration message (620).

And regular BSR is triggered for one or more LCHs which triggers SR (630).

In an embodiment of this disclosure, if the LCH which triggered the SR (BSR→SR) is configured/indicated to use both sparse and dense SR periodicity (i.e., LCH is mapped to two SR configuration, one SR configuration having PUCCH resource with sparse periodicity and another SR configuration having PUCCH resource with dense periodicity; or LCH is mapped to SR configuration with two PUCCH periodicity, sparse and dense periodicity), a UE perform the following operation:

if the UE is in active time: the UE uses the PUCCH resources with dense SR periodicity for the LCH;

Else if the UE is in not in active time: the UE uses the PUCCH resources with sparse SR periodicity for the LCH (640);

Else if the LCH which triggered the SR (BSR→SR) is configured/indicated to use only one SR periodicity i.e., PUCCH resources with one SR periodicity: As in legacy, the UE uses the PUCCH resources with SR periodicity configured for the LCH.

[Method 2-3]

Figure 7:
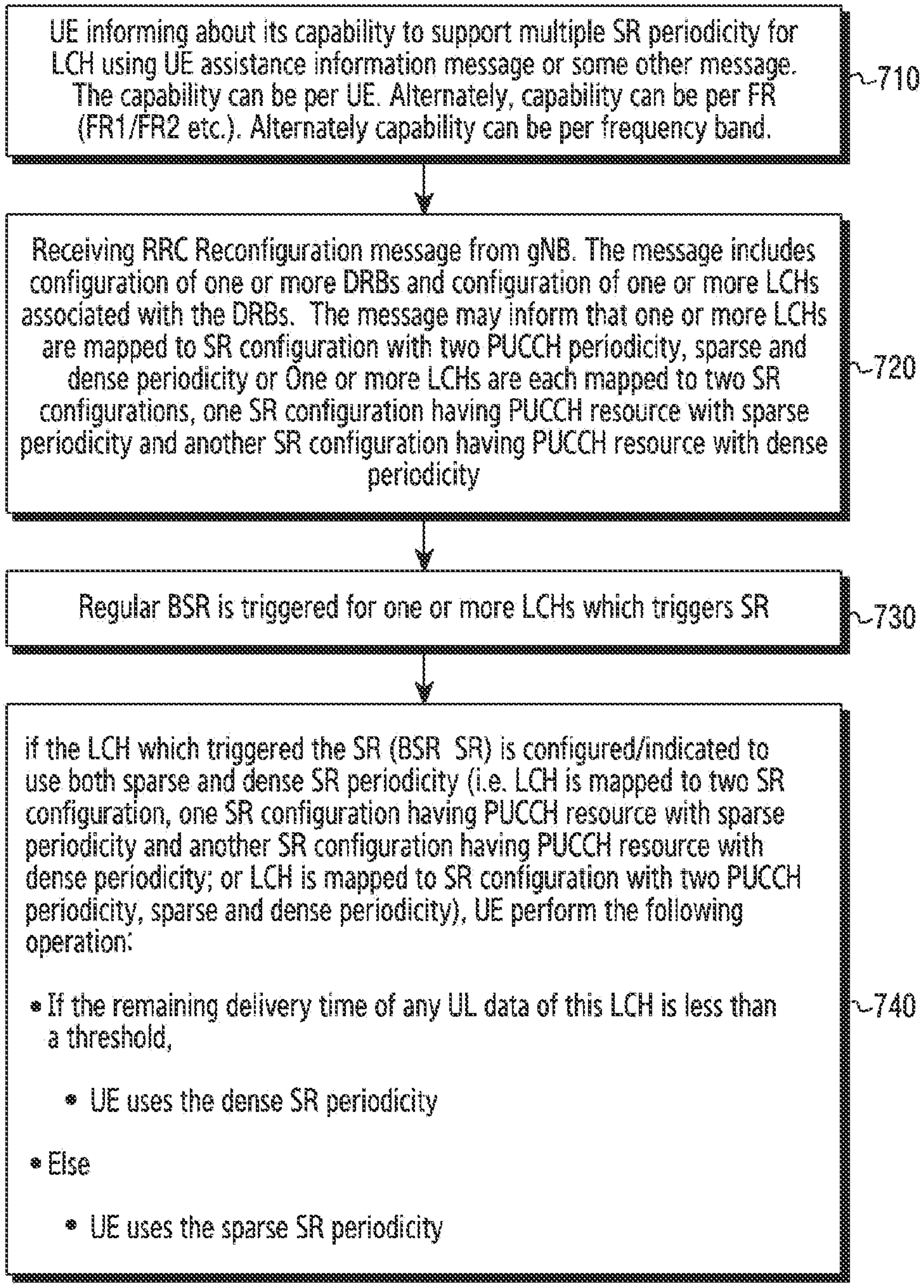
FIG. 7 illustrates another example of enhanced scheduling request in accordance with another embodiment of the present disclosure.

FIG. 7 illustrates an example of enhanced scheduling request in accordance with another embodiment of the present disclosure.

In an embodiment according to this method of disclosure, it is provided that two SR periodicity are configured by RRC signaling (e.g., RRC reconfiguration message), sparse (PUCCH resources occur at longer periodicity, periodicity 1) and dense (PUCCH resources occur at shorter periodicity, periodicity 2). A UE may inform about its capability to support multiple SR periodicity for a LCH using a UE assistance information message or some other message. The capability can be per UE. Alternately, capability can be per FR (FR1/FR2 etc.). Alternately capability can be per frequency band (710).

One or more LCHs are mapped to SR configuration with two PUCCH periodicity, sparse and dense periodicity; mapping is signaled by a gNB in an RRC reconfiguration message.

One or more LCHs are each mapped to two SR configurations, one SR configuration having PUCCH resource with sparse periodicity and another SR configuration having PUCCH resource with dense periodicity. Mapping is signaled by a gNB in an RRC reconfiguration message (720).

And regular BSR is triggered for one or more LCHs which triggers SR (730).

In an embodiment of this disclosure, if the LCH which triggered the SR (BSR→SR) is configured/indicated to use both sparse and dense SR periodicity (i.e., LCH is mapped to two SR configuration, one SR configuration having PUCCH resource with sparse periodicity and another SR configuration having PUCCH resource with dense periodicity; or LCH is mapped to SR configuration with two PUCCH periodicity, sparse and dense periodicity, periodicity 1 and periodicity 2), a UE performs the following operation:

If the remaining delivery time of any UL data of this LCH is less than a threshold, a UE uses the dense SR periodicity (periodicity 2), the UE uses the PUCCH resources with dense SR periodicity (periodicity 2) for the LCH.

Else the UE uses the sparse SR periodicity (periodicity 1), the UE uses the PUCCH resources with sparse SR periodicity (periodicity 1), for the LCH (740).

Else if the LCH which triggered the SR (BSR→SR) is configured/indicated to use only one SR periodicity i.e., PUCCH resources with one SR periodicity:

As in legacy, the UE uses the PUCCH resources with SR periodicity configured for the LCH.

[Method 2-4]

In an embodiment according to this method of disclosure, it is provided that two SR periodicity are configured by RRC signaling (e.g., RRC reconfiguration message), sparse (PUCCH resources occur at longer periodicity, periodicity 1) and dense (PUCCH resources occur at shorter periodicity, periodicity 2). A UE may inform about its capability to support multiple SR periodicity for a LCH using a UE assistance information message or some other message. The capability can be per UE. Alternately, capability can be per FR (FR1/FR2 etc.). Alternately capability can be per frequency band.

One or more LCHs are mapped to SR configuration with two PUCCH periodicity, sparse and dense periodicity; mapping is signaled by a gNB in an RRC reconfiguration message.

One or more LCHs are each mapped to two SR configurations, one SR configuration having PUCCH resource with sparse periodicity and another SR configuration having PUCCH resource with dense periodicity. Mapping is signaled by a gNB in an RRC reconfiguration message.

In an embodiment of this disclosure, if the LCH which triggered the SR (BSR→SR) is configured/indicated to use both sparse and dense SR periodicity (i.e., LCH is mapped to two SR configuration, one SR configuration having PUCCH resource with sparse periodicity and another SR configuration having PUCCH resource with dense periodicity; or LCH is mapped to SR configuration with two PUCCH periodicity, sparse and dense periodicity, periodicity 1 and periodicity 2), a UE performs the following operation:

If the gNB indicated in MAC CE or DCI of PDCCH to use dense SR periodicity or periodicity 2 (alt indication can be in RRC as well, a gNB can indicate which of two periodicities is active for LCH), a UE uses the dense SR periodicity (periodicity 2), the UE uses the PUCCH resources with dense SR periodicity (periodicity 2) for the LCH.

Else if the gNB indicated in MAC CE or DCI of PDCCH to use sparse SR periodicity or periodicity 1 (alt indication can be in RRC as well, a gNB can indicate which of two periodicities is active for LCH).

a UE uses the sparse SR periodicity (periodicity 1), the UE uses the PUCCH resources with sparse SR periodicity (periodicity 1), for the LCH.

Else if the LCH which triggered the SR (BSR→SR) is configured/indicated to use only one SR periodicity i.e., PUCCH resources with one SR periodicity:

As in legacy, a UE uses the PUCCH resources with SR periodicity configured for the LCH.

In an embodiment, UL active time can be defined by a periodic cycle and a duration, where a UE only transmits UL signals/data during the duration time of the cycle, and the UE does not transmit UL signals/data outside the duration of the cycle. It may need to consider further details of this approach.

If the UL TX cycle is configured, besides the duration of the cycle, the time duration of active time as per DRX may be considered as UL active time and a UE is allowed to transmit there.

If the data arrives for certain LCHs (e.g., URLLC) indicated in RRC signaling, a UE may be allowed to transmit outside the UL active time.

RA triggered for reasons other than BSR (e.g., beam failure recovery (BFR), listen before talk (LBT) failure etc.) may be allowed outside the UL active time. The gNB can send some configuration/indication to allow/disallow transmission outside UL active time.

This UL TX cycle, active time may be restricted to certain LCH(s) indicated by gNB:

the UL DTX can be also configured per cell group with the list of associated LCH(s).

a gNB can indicate the list of LCH(s) having no restriction on UL Tx timing, instead of indicating LCH(s) associated with the UL Tx cycle.

Figure 8:
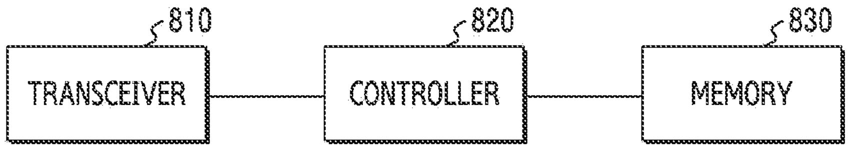
FIG. 8 illustrates an example of terminal according to an embodiment of the present disclosure.

FIG. 8 illustrates an example of terminal according to an embodiment of the present disclosure.

Referring to FIG. 8, a terminal includes a transceiver 810, a controller 820 and a memory 830. The controller 820 may refer to a circuitry, an application-specific integrated circuit (ASIC), or at least one processor. The transceiver 810, the controller 820 and the memory 830 are configured to perform the operations of the UE illustrated in the figures, e.g., FIGS. 1 to 7, or described above. Although the transceiver 810, the controller 820 and the memory 830 are shown as separate entities, they may be realized as a single entity like a single chip. Or the transceiver 810, the controller 820 and the memory 830 may be electrically connected to or coupled with each other.

The transceiver 810 may transmit and receive signals to and from other network entities, e.g., a base station. The controller 820 may control the UE to perform functions according to one of the embodiments described above. The controller 820 may refer to a circuitry, an ASIC, or at least one processor. In an embodiment, the operations of the terminal may be implemented using the memory 830 storing corresponding program codes. Specifically, the terminal may be equipped with the memory 830 to store program codes implementing desired operations. To perform the desired operations, the controller 820 may read and execute the program codes stored in the memory 830 by using a processor or a central processing unit (CPU).

Figure 9:
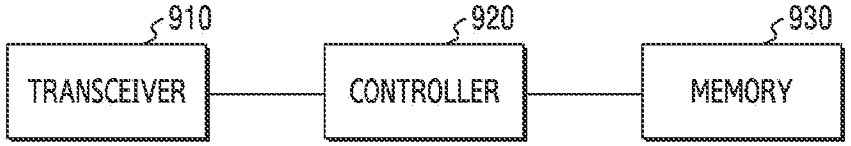
FIG. 9 illustrates an example of base station according to an embodiment of the present disclosure.

FIG. 9 illustrates an example of base station according to an embodiment of the present disclosure.

Referring to FIG. 9, a base station includes a transceiver 910, a controller 920 and a memory 930. The transceiver 910, the controller 920 and the memory 930 are configured to perform the operations of the network (e.g., gNB) illustrated in the figures, e.g., FIGS. 1 to 7, or described above. Although the transceiver 910, the controller 920 and the memory 930 are shown as separate entities, they may be realized as a single entity like a single chip. The transceiver 910, the controller 920 and the memory 930 may be electrically connected to or coupled with each other.

The transceiver 910 may transmit and receive signals to and from other network entities, e.g., a terminal. The controller 920 may control the base station to perform functions according to one of the embodiments described above. The controller 920 may refer to a circuitry, an ASIC, or at least one processor. In an embodiment, the operations of the base station may be implemented using the memory 930 storing corresponding program codes. Specifically, the base station may be equipped with the memory 930 to store program codes implementing desired operations. To perform the desired operations, the controller 920 may read and execute the program codes stored in the memory 930 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

What is claimed is:

1. A method performed by a terminal in a wireless communication system, the method comprising:

receiving, from a base station, a radio resource control (RRC) message including a threshold for triggering a medium access control control element (MAC CE);

identifying that a shortest remaining time value among all data buffered in a logical channel group (LCG) is less than the threshold; and in response to identifying, transmitting, to the base station, the MAC CE, wherein the MAC CE includes information associated with the LCG, information on a buffer size for the LCG, and information on the identified shortest remaining time value for the LCG.

2. The method of claim 1, wherein the threshold is configured by the base station for the LCG.

3. The method of claim 1, wherein the data is associated with an extended reality (XR).

4. The method of claim 1, wherein the information on the buffer size for the LCG and the information on the identified shortest remaining time value for the LCG included in the MAC CE are XR assistance information used for scheduling of an XR service.

5. A method performed by a base station in a wireless communication system, the method comprising:

transmitting, to a terminal, a radio resource control (RRC) message including a threshold for triggering a medium access control control element (MAC CE); and receiving, from the terminal, the MAC CE, wherein the MAC CE includes information associated with a logical channel group (LCG), information on a buffer size for the LCG, and information on a shortest remaining time value among all data buffered in the LCG which is less than the threshold.

6. The method of claim 5, wherein the threshold is configured by the base station for the LCG.

7. The method of claim 5, wherein the data is associated with an extended reality (XR).

8. The method of claim 5, wherein the information on the buffer size for the LCG and the information on the shortest remaining time value for the LCG included in the MAC CE are XR assistance information used for scheduling of an XR service.

9. A terminal in a wireless communication system, the terminal comprising:

a transceiver; and a controller coupled with the transceiver and configured to:

receive, from a base station, a radio resource control (RRC) message including a threshold for triggering a medium access control control element (MAC CE), identify that a shortest remaining time value among all data buffered in a logical channel group (LCG) is less than the threshold, and in response to identifying, transmit, to the base station the MAC CE, wherein the MAC CE includes information associated with the LCG, information on a buffer size for the LCG, and information on the identified shortest remaining time value for the LCG.

10. The terminal of claim 9, wherein the threshold is configured by the base station for the LCG.

11. The terminal of claim 9, wherein the data is associated with an extended reality (XR).

12. The terminal of claim 9, wherein the information on the buffer size for the LCG and the information on the identified shortest remaining time value for the LCG included in the MAC CE are XR assistance information used for scheduling of an XR service.

13. A base station in a wireless communication system, the base station comprising:

a transceiver; and a controller coupled with the transceiver and configured to:

transmit, to a terminal, a radio resource control (RRC) message including a threshold for triggering a medium access control control element (MAC CE), and receive, from the terminal, the MAC CE, wherein the MAC CE includes information associated with a logical channel group (LCG), information on a buffer size for the LCG, and information on a shortest remaining time value among all data buffered in the LCG which is less than the threshold.

14. The base station of claim 13, wherein the threshold is configured by the base station for the LCG.

15. The base station of claim 13, wherein the data is associated with an extended reality (XR).

16. The base station of claim 13, wherein the information on the buffer size for the LCG and the information on the shortest remaining time value for the LCG included in the MAC CE are XR assistance information used for scheduling of an XR service.

* * * * *